(12) United States Patent
McCarney

(10) Patent No.: US 9,913,481 B2
(45) Date of Patent: Mar. 13, 2018

(54) PORTABLE TORTILLA PRESS ASSEMBLY

(71) Applicant: Kevin McCarney, Burbank, CA (US)

(72) Inventor: Kevin McCarney, Burbank, CA (US)

( * ) Notice: Subject to any disclaimer, the term of this patent is extended or adjusted under 35 U.S.C. 154(b) by 45 days.

(21) Appl. No.: 15/170,318

(22) Filed: Jun. 1, 2016

(65) Prior Publication Data
US 2017/0347669 A1 Dec. 7, 2017

(51) Int. Cl.
*A21C 11/00* (2006.01)
*A21C 11/08* (2006.01)

(52) U.S. Cl.
CPC ............ *A21C 11/006* (2013.01); *A21C 11/08* (2013.01); *A21C 11/004* (2013.01)

(58) Field of Classification Search
CPC ............................ A21C 11/006; A21C 11/004
USPC .......... 99/349, 353, 432; 425/383, 385, 394, 425/408, 409
See application file for complete search history.

(56) References Cited

U.S. PATENT DOCUMENTS

| | | | | |
|---|---|---|---|---|
| 1,459,976 A | * | 6/1923 | Gore ................... | A21C 11/006 123/61 V |
| 3,352,258 A | * | 11/1967 | Lassaulx .................. | A21B 5/03 425/394 |
| 5,253,565 A | * | 10/1993 | Burton ................. | A47J 37/0611 219/524 |
| 6,202,544 B1 | * | 3/2001 | Martinez .............. | A47J 37/0611 219/521 |
| 6,205,914 B1 | * | 3/2001 | McCarney ........... | A21C 11/006 425/385 |
| 2016/0174577 A1 | * | 6/2016 | Saldana Garza ...... | A21C 9/063 99/450.6 |

* cited by examiner

*Primary Examiner* — Reginald L Alexander
(74) *Attorney, Agent, or Firm* — Tsircou Law, P.C.

(57) ABSTRACT

A portable tortilla press assembly for molding a food product into a flat disk with a removable, reversible molding plate that is inserted between a base and a push plate. The tortilla press assembly operates via lever, with a roller along the body of the lever. The lever attaches via a hinge, opposite to and elevated above another hinge connecting to the push plate. When the lever is in the downward position, the roller pushes down on the plates with a rolling motion, smoothly forming a uniform, even tortilla. The molding plate has two sides defining two different forming surfaces, each sized to mold a different-sized tortilla.

18 Claims, 5 Drawing Sheets

PORTABLE TORTILLA PRESS ASSEMBLY

INCORPORATION BY REFERENCE

Food molding assemblies such as tortilla presses are known in the art and generally shown in U.S. Pat. Nos. 6,205,914, 6,244,167, 7,140,864, and 9,149,046 to McCarney. These patents are incorporated by reference herein to provide background information on tortilla presses.

FIELD OF THE INVENTION

The present invention relates generally to forming flattened food products such as tortillas, hamburger patties, pizza dough, and others. More particularly, the invention relates to a portable tortilla press assembly for forming a flattened food product from a ball of dough, meat, and others.

BACKGROUND OF THE INVENTION

It is well known that food products such as tortillas, hamburger patties, and pizza dough are formed from a ball of dough or meat. This can be done by hand or with a rolling pin. To solve the need for faster and more uniform tortilla making, various tortilla presses exist.

U.S. Pat. No. 6,205,914 to McCarney discloses a tortilla forming machine that forms a tortilla between two forming surfaces using removable sizing rings to control the tortilla size.

U.S. Pat. No. 9,149,046 to McCarney discloses a tortilla forming machine with a molding plate having two forming surfaces that can be used interchangeably to provide different options for sizes and/or embossing of the tortilla shell.

It should be appreciated that there remains a need for an improved, portable tortilla press that can form two different types of flattened food products with a single streamlined plate, while creating an even product with a near-perfect disc shape. The present invention solves these needs and others.

SUMMARY OF THE INVENTION

Briefly, and in general terms, by example and not limitation, the invention provides a food press assembly, referred to herein as a tortilla press assembly. Said tortilla press assembly comprises a push plate and a removable molding plate that couples to a slotted base. The push plate attaches to the base with a first hinge, so that it may be opened and closed to insert and remove dough. The molding plate has two sides defining two different forming surfaces. Each forming surface is sized to mold a different-sized flattened food product. The invention may be used to form virtually any food product that is desirable to form from a ball into a flattened shape, including but not limited to tortillas, pizza dough, and hamburgers. Thus, the molding plate may be flipped to select a tortilla of different thickness or diameter.

In a detailed aspect of an exemplary embodiment in accordance with the invention, a tortilla is formed when a user presses down on a lever arm. The lever arm is affixed to the base via a second hinge on the opposite side of the tortilla press assembly to the first hinge. The second hinge is elevated above said first hinge. The lever arm is further fitted with a roller that presses down on the push plate when the lever arm is in a downward position.

More specifically, in an exemplary embodiment in accordance with the invention, the roller has a curved profile, so that it rolls down on the push plate. Any shape suitable to rolling may be used, such as a cylinder with its axis parallel to the lever arm. Thus, when a user presses down on the lever, the roller strikes the push plate at an angle, pushing down in a rolling motion and smoothly and uniformly rolling out inserted dough. In a preferred embodiment, the lever arm further provides a grasp ball to give the user a comfortable grip.

In another detailed aspect of an exemplary embodiment in accordance with the invention, the base is slotted to accommodate the molding plate, making the molding plate easy to move and replace. Preferably, the base has an open side, a closed side, and two grooved sides. The molding plate can then slide into the opened side, then slide along the grooved sides until it hits the closed side.

In another detailed aspect of an exemplary embodiment in accordance with the invention, the molding plate may be embossed with a pattern or logo. In this embodiment, the molding plate can be flipped to select a different embossing. The push plate has a smooth, planar surface. In a preferred embodiment, the plates are in a square shape and the forming surface is a circular indentation within the molding plate.

In another detailed aspect of an exemplary embodiment in accordance with the invention, the plates are made of wood with a food-grade stain. But the plates can be made of any material suitable for use with food, such as stainless steel. The forming surfaces can be coated with a non-stick material such as Teflon™.

In another detailed aspect of an exemplary embodiment in accordance with the invention, there are air holes in the molding plate. In the case of a square molding plate, there is a hole in each corner. These holes serve to displace air and to avoid suction or air bubbles from interfering with the uniformity of the tortilla formed.

In yet another detailed aspect of an exemplary embodiment in accordance with the invention, the push plate opens and closes via a hinge. With the push plate open, the tortilla press assembly is in a loading position, enabling the user to place dough in the tortilla press, remove the resulting tortilla, and remove and reinsert the molding plate. With the push plate down, the tortilla press assembly is in a forming position. The tortilla press assembly may further provide a handle on the top side of the push plate, enabling the user to easily open and close said push plate.

It is accordingly an object of the present invention to provide an improved tortilla press assembly for molding a tortilla from a ball of dough.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
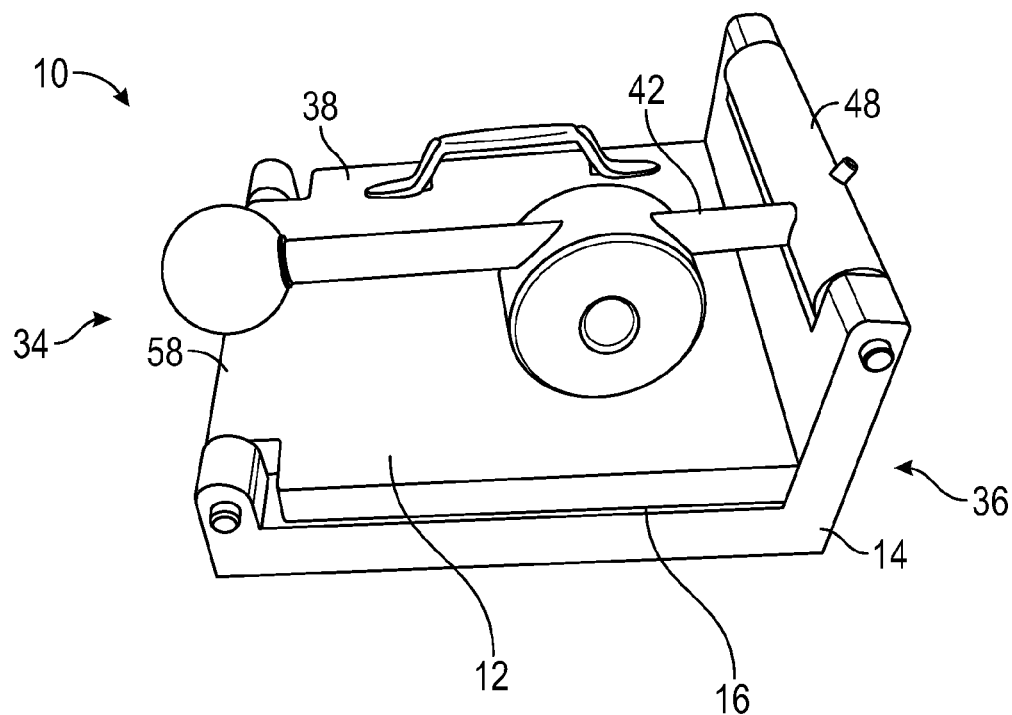
FIG. 1 is a front perspective view of a tortilla press assembly in accordance with the invention.

With reference now to the drawings, and particularly FIGS. 1-4, there is shown a tortilla press assembly 10 that molds dough into a tortilla or other flattened food product between a push plate 12 and removable molding plate 16 that fits in a slotted base 14.

The push plate 12 is attached to the base with a first hinge 58 oriented on a front side 34 of the tortilla press assembly. A second hinge 48 connects a lever assembly 40 perpendicularly to the rear side of the tortilla press 36. The lever assembly further comprises a lever arm 42 and a roller 44. Said roller should have a rounded edge so that it creates a rolling motion when pushed down onto the plates, i.e. a cylindrical roller. Said roller preferably attaches to said lever near the halfway point of the lever, but closer to the second hinge 48, to create optimum force distribution. Further, the second hinge 48 is elevated above the first hinge 58 by several inches. Together, these features ensure smooth force distribution as the press is activated, as the roller comes down at an angle with a rolling motion towards the center of the apparatus. The lever assembly 40 further provides a grasp ball 46 for a user to comfortably hold when actuating the lever arm.

Figure 2:
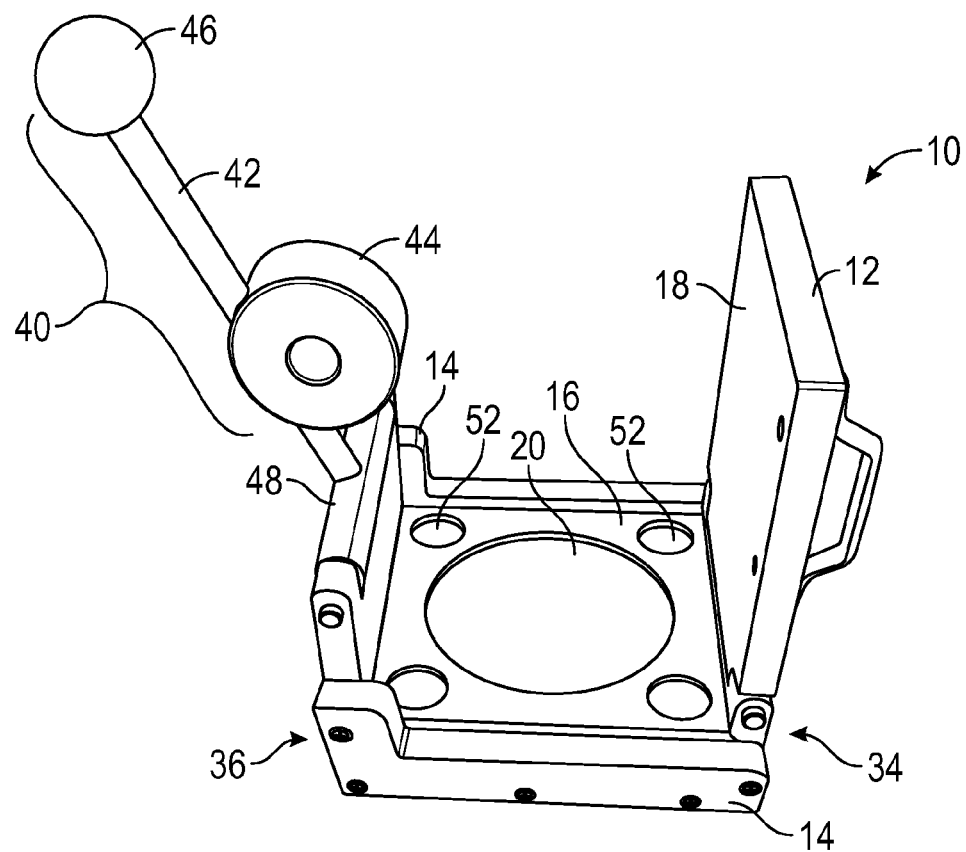
FIG. 2 is a side elevational view of the tortilla press assembly of FIG. 1, depicting the push plate in a loading position.

FIG. 2 shows the tortilla press assembly 10 in loading position. The lever arm 42 is lifted up so that it is substantially transverse to the base 14 and molding plate 16. The push plate 12 is also in a lifted position substantially transverse to the base and molding plate. The push plate is attached to the base via second hinge 58, so that it may be lifted in and out of the loading position.

Figure 3:
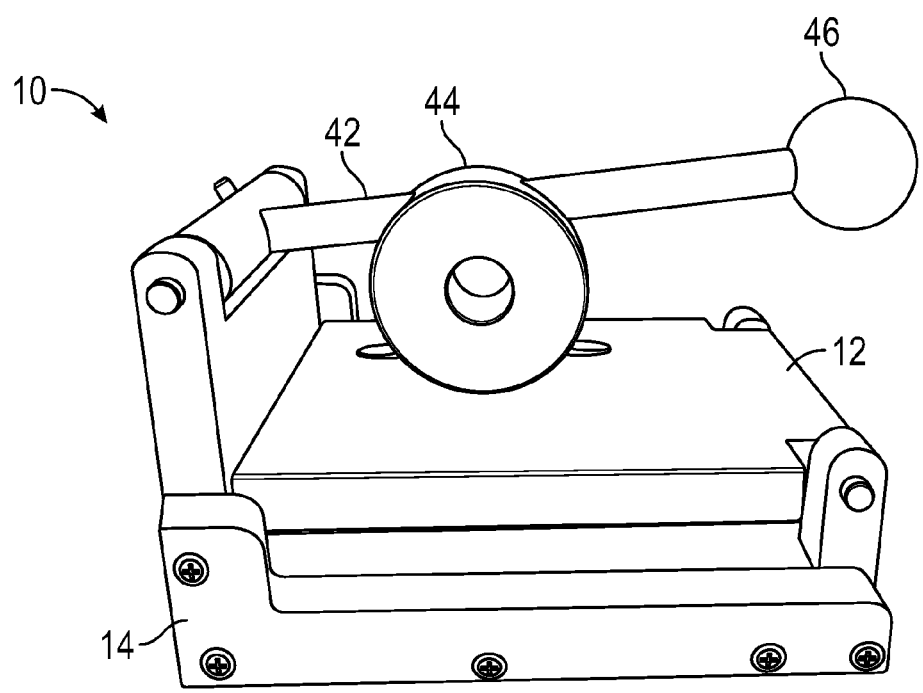
FIG. 3 is a side elevational view of a first side of the tortilla press assembly of FIG. 1, depicting the push plate in the forming position.
Figure 4:
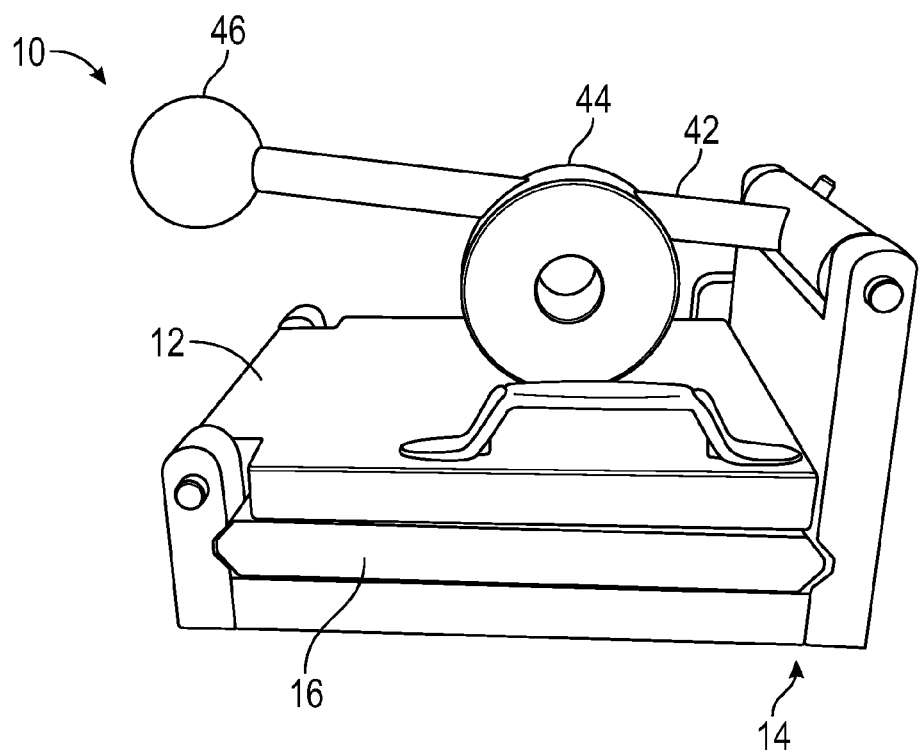
FIG. 4 is a side elevational view of a second side of the tortilla press assembly of FIG. 1, depicting the push plate in the forming position.

FIGS. 3 and 4 show the tortilla press assembly 10 in forming position. The push plate 12 is pushed down to lie on top of the molding plate 16. The lever arm 42 is pushed down towards the molding plate and base. The roller 44 touches and presses down on the top surface 38 of the push plate 12. This in turn creates pressure through the push plate so that a first forming surface 18 pushes down on an inserted ball of dough.

Figure 5:
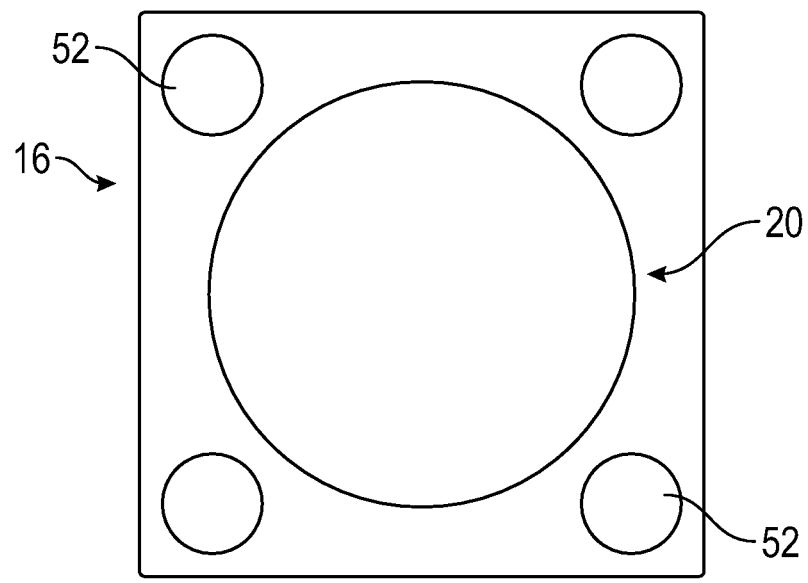
FIG. 5 is plan view of a first side of a molding plate of the tortilla press assembly of FIG. 1.
Figure 6:
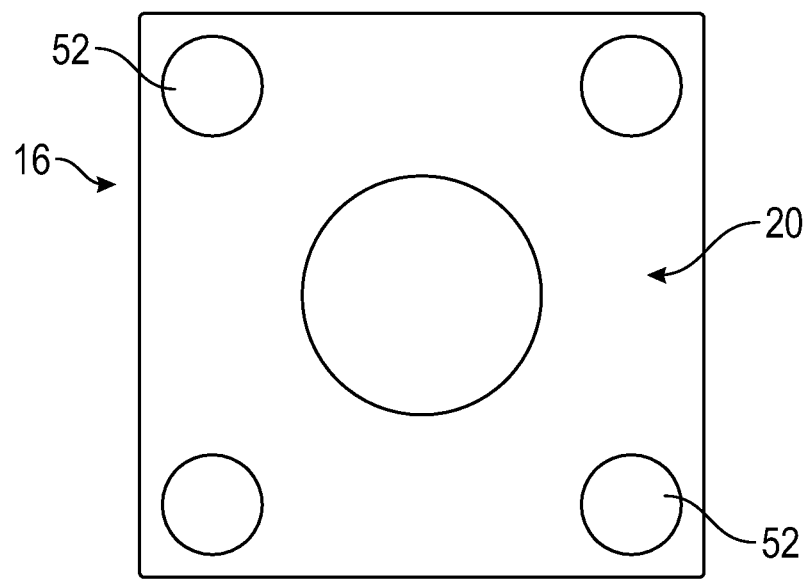
FIG. 6 is plan view of a second side of a molding plate of the tortilla press assembly of FIG. 1.

Referring now to FIGS. 5-6, the molding plate 16 has two sides, the first providing a second forming surface 20, and the second providing a third forming surface 22 (collectively, forming surfaces 20, 22). The molding plate 16 slides out from the tortilla press assembly 10, permitting a user to select the desired forming surface 20, 22. The user places the molding plate 16 such that the desired forming surface 20, 22 is in an upward-facing position on top of the base 14. The molding plate 16 is fitted with four air holes 52. Said air holes help prevent air from accumulating in the tortilla press, avoiding air bubbles.

Figure 7:
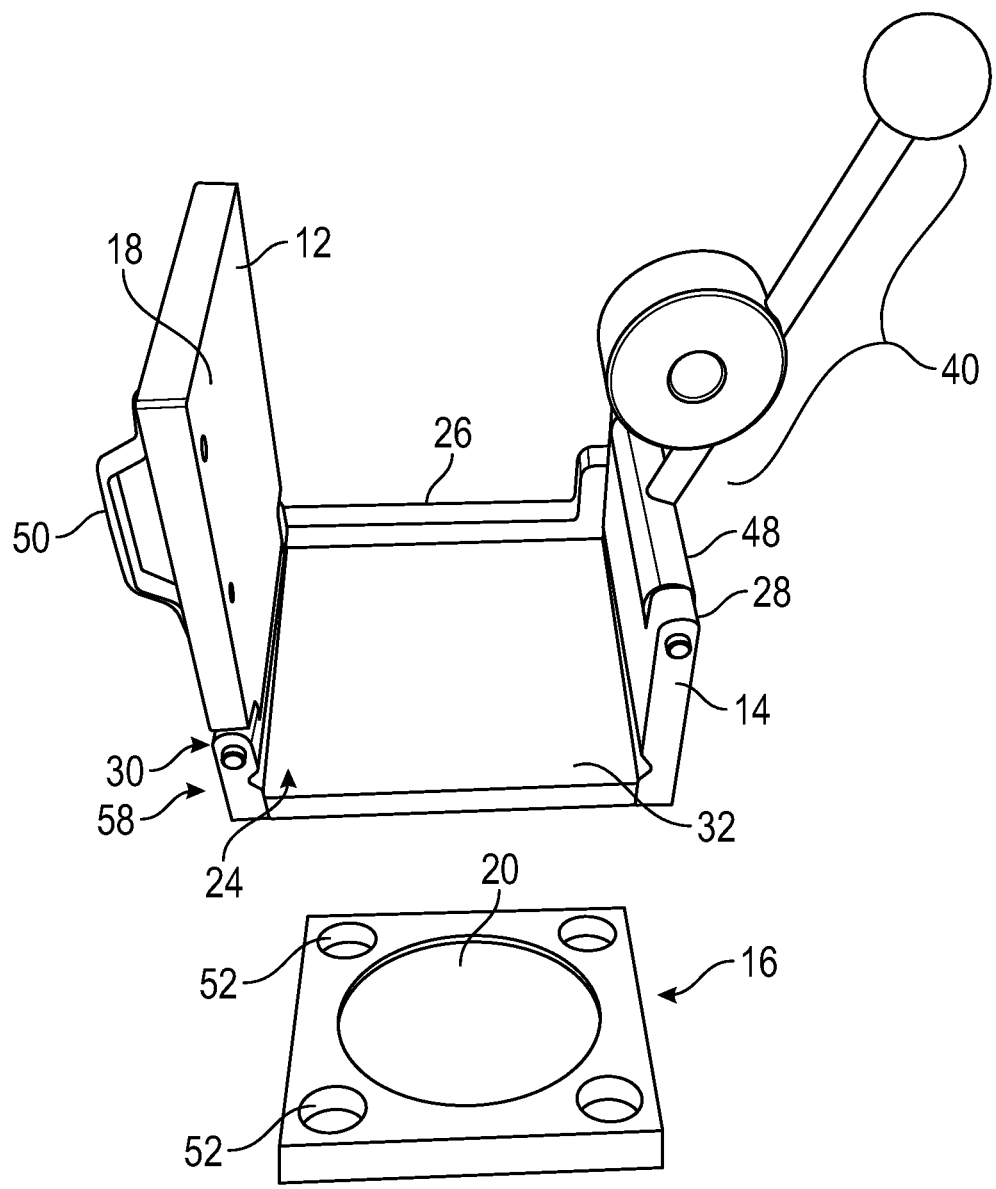
FIG. 7 is a side perspective view of the tortilla press assembly of FIG. 1, depicting a molding plate removed from a base and positioned adjacent to the base.

Referring now to FIG. 7, the base 14 provides a cavity 24 that supports the molding plate 16. The base cavity 24 is formed by the base's side wall 26, front wall 30, rear wall 28, and top surface 32, so that the molding plate 16 can slide in and out of the side opposite the side wall. Preferably, the front wall 30 and rear wall 28 are grooved along the interior face, so that the molding plate easily slides into the base cavity. The base cavity should be shaped in a slotted fashion to accommodate the shape of the molding plate.

Figure 8:
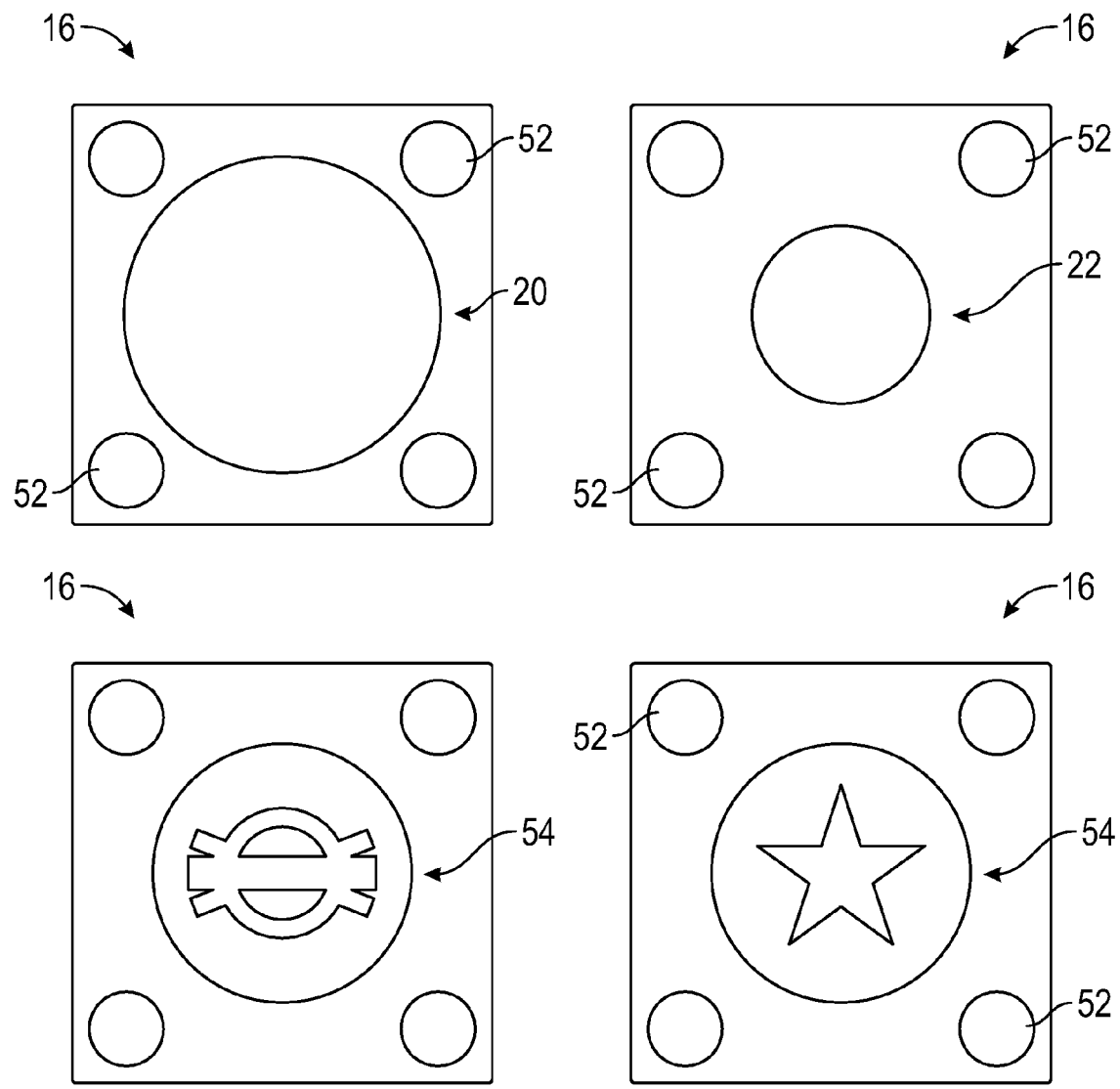
FIG. 8 is a plan view depicting several forming surfaces useable with the tortilla press assembly of FIG. 1.

FIG. 8 shows a variety of forming surfaces 20, 22 that may be used on the molding plate 16. In an exemplary embodiment, the second forming surface 20 uses a large circular indentation to form a relatively large tortilla, such as a flour tortilla. The third forming surface 22 uses a smaller circular indentation to form a smaller tortilla, such as a corn tortilla. However, the first forming surface 20 and second forming surface 22 can be any desired combination of sizes and shapes of tortilla molds. The forming surfaces 20, 22 may also be engraved with a stamp 54 to emboss a logo or image on the tortilla.

To make a tortilla, a user starts with the tortilla press assembly 10 in the loading position (shown in FIG. 2). The user then places a ball of dough onto the desired forming surface 20, 22. The user then closes the push plate 12. When the user brings the lever arm 42 down from the loading position to the forming position (shown in FIG. 3), the roller 44 pushes down on the top surface 38 of the push plate 12. The user then pulls the lever arm 42 back into the loading position and opens the push plate 12 to remove the formed tortilla. A handle 50 is provided on the push plate to aid the user in opening and closing said push plate.

It should be appreciated from the foregoing that the present invention provides an improved tortilla press assembly. The tortilla press assembly is small enough to be portable, while still providing molds to create two different types of tortillas. The tortilla press assembly further provides a way to form a very uniform tortilla.

Although the invention has been disclosed in detail with reference only to the exemplary embodiments, those skilled in the art will appreciate that various other embodiments can be provided without departing from the scope of the invention. Accordingly, the invention is defined only by the claims set forth below.

What is claimed is:

1. A tortilla press assembly for forming a tortilla comprising:
    a base defining a forming region, the base having a first hinge and a second hinge disposed on an opposing second side of the forming region relative to the first hinge, in which the second hinge is disposed at a greater height above the forming region relative to the first hinge;
    a push plate having a first forming surface, the push plate coupled to the base via the first hinge;
    a lever assembly coupled to the base via the second hinge, the lever assembly including a lever arm fitted with a roller positioned to contact the push plate in a press position, further having a grasp ball on the lever arm; and a removable molding plate that is removably disposed in the forming region between the first hinge and the second hinge, the molding plate having a first side defining a second forming surface having a first diameter that results in a forming a tortilla shell sized to the first diameter in a cooperative manner with the first forming surface of the push plate.

2. The tortilla press assembly of claim 1, the removable molding plate further having a second side defining a third forming surface having a second diameter that results in a forming a tortilla shell sized to the second diameter in a cooperative manner with the first forming surface of the push plate, wherein at least one of the second forming surface and the third forming surface is configured for embossing or imprinting onto the tortilla.

3. The tortilla press assembly of claim 2, wherein at least one of the first forming surface, the second forming surface, and the third forming surface is composed of non-stick material.

4. The tortilla press assembly of claim 1, wherein the molding plate further comprises air holes.

5. The tortilla press assembly of claim 1, wherein the roller is cylindrical.

6. The tortilla press assembly of claim 1, wherein the tortilla press assembly is substantially composed of wood.

7. The tortilla press assembly of claim 1, wherein the second hinge is elevated above the first hinge.

8. The tortilla press assembly of claim 1, wherein the first forming surface is smooth and planar.

9. A tortilla press assembly for forming a tortilla, comprising:
   a base;
   a removable molding plate;
   a push plate having a first forming surface;
      the push plate is attached by a first hinge to a front side of said tortilla press assembly; and
   a lever assembly;
   the lever assembly comprising:
      a second hinge attached to a rear wall of the tortilla press assembly;
      a lever arm extending perpendicularly from said hinge; and
      a roller affixed along the body of said lever arm;
   the molding plate comprising:
      a first side;
      a second side;
      the first side comprising a second forming surface having a first circular recessed portion;
      the second side comprising a third forming surface having a second circular recessed portion.

10. The tortilla press assembly of claim 9, wherein at least one of the second forming surface and the third forming surface is configured for embossing or imprinting onto the tortilla shell.

11. The tortilla press assembly of claim 9, wherein at least one of the first forming surface, the second forming surface, and the third forming surface is composed of non-stick material.

12. The tortilla press assembly of claim 9, wherein the molding plate is square, with four holes proximate to the corners of said molding plate.

13. The tortilla press assembly of claim 9, wherein the lever arm provides a grasp ball.

14. The tortilla press assembly of claim 9, wherein the roller is cylindrical.

15. The tortilla press assembly of claim 9, further providing a handle on a top surface of the push plate.

16. The tortilla press assembly of claim 9, where the tortilla press assembly is substantially composed of wood.

17. The tortilla press assembly of claim 9, wherein the second hinge is elevated above the first hinge.

18. The tortilla press assembly of claim 9, wherein the first forming surface is smooth and planar.

* * * * *